United States Patent
Gou et al.

(10) Patent No.: US 12,418,911 B2
(45) Date of Patent: Sep. 16, 2025

(54) TRANSMISSION METHOD, COMMUNICATION NODE AND MEDIUM (71) Applicant: ZTE CORPORATION, Guangdong (CN)

(72) Inventors: Wei Gou, Guangdong (CN); Peng Hao, Guangdong (CN); Xianghui Han, Guangdong (CN); Yu Ngok Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 423 days.

(21) Appl. No.: 17/635,068

(22) PCT Filed: Aug. 3, 2020

(86) PCT No.: PCT/CN2020/106494
§ 371 (c)(1),
(2) Date: Feb. 14, 2022

(87) PCT Pub. No.: WO2021/027604
PCT Pub. Date: Feb. 18, 2021

(65) Prior Publication Data
US 2022/0295521 A1  Sep. 15, 2022

Related U.S. Application Data (60) Provisional application No. 63/253,574, filed on Oct. 8, 2021.

(30) Foreign Application Priority Data

Aug. 14, 2019  (CN) .......................... 201910749260.1

(51) Int. Cl.
H04W 72/1268  (2023.01)
H04L 1/1812   (2023.01)
(Continued)

(52) U.S. Cl.
CPC ....... *H04W 72/1268* (2013.01); *H04L 1/1812* (2013.01); *H04L 5/0053* (2013.01); *H04W 72/569* (2023.01)

(58) Field of Classification Search
None
See application file for complete search history.

(56) References Cited

U.S. PATENT DOCUMENTS 9,520,984 B2 * 12/2016 Yang .......................... H04L 5/14
11,265,854 B2 * 3/2022 Yang ................. H04W 72/0446
(Continued)

FOREIGN PATENT DOCUMENTS

CN  109155726 A  1/2019
CN  109392126 A  2/2019
(Continued)

OTHER PUBLICATIONS

Nokia et al. "On UCI Enhancements for NR URLLC" 3GPP TSG RAN WG1#97 R1-1906752, May 17, 2019, section 3.
(Continued)

*Primary Examiner* — Xavier S Wong
(74) *Attorney, Agent, or Firm* — KDW FIRM PLLC (57) ABSTRACT Provided are a transmission method, a transmission apparatus, a communication node and a medium. The transmission method includes: in a case where a physical uplink control channel (PUCCH) of a target scheduling request (SR) and a PUCCH of hybrid automatic repeat request-acknowledgment (HARQ-ACK) information overlap in a time domain, determining a transmission mechanism for the target SR and the HARQ-ACK information; and performing a transmission operation according to the transmission mechanism.

18 Claims, 2 Drawing Sheets

In a case where at least two positive SRs to be transmitted overlap in a time domain with a PUCCH format 1 of the HARQ-ACK information, select one positive SR from the at least two positive SRs as a target SR — 210

In a case where a PUCCH of the target SR and the PUCCH of the HARQ-ACK information overlap in a time domain, determine a transmission mechanism for the target SR and the HARQ-ACK information — 220

Perform a corresponding transmission operation according to the transmission mechanism — 230

(51) Int. Cl.
*H04L 5/00* (2006.01)
*H04W 72/566* (2023.01)

(56) References Cited

U.S. PATENT DOCUMENTS

| | | | | |
|---|---|---|---|---|
| 2017/0223694 | A1* | 8/2017 | Han | H04W 16/32 |
| 2018/0310257 | A1 | 10/2018 | Papasakellariou | |
| 2019/0246432 | A1 | 8/2019 | Hosseini et al. | |
| 2020/0068599 | A1* | 2/2020 | Yang | H04L 5/0055 |
| 2020/0120660 | A1* | 4/2020 | Wang | H04W 72/21 |
| 2020/0280427 | A1* | 9/2020 | Liu | H04L 5/023 |
| 2021/0211241 | A1* | 7/2021 | Xiong | H04W 72/0446 |
| 2021/0266911 | A1* | 8/2021 | Zhao | H04W 72/0446 |
| 2022/0191890 | A1* | 6/2022 | Guo | H04W 72/566 |
| 2022/0361199 | A1* | 11/2022 | Yin | H04L 27/2605 |

FOREIGN PATENT DOCUMENTS

| | | |
|---|---|---|
| CN | 109986337 A | 7/2019 |
| CN | 110034850 A | 7/2019 |
| CN | 110034885 A | 7/2019 |
| CN | 110035445 A | 7/2019 |
| CN | 110536464 A | 12/2019 |
| WO | 2019031954 A1 | 2/2019 |
| WO | 2019054388 A1 | 3/2019 |
| WO | 2019130522 A1 | 4/2019 |
| WO | 2019136706 A1 | 7/2019 |
| WO | 2019137503 A1 | 7/2019 |
| WO | 2019143131 A1 | 7/2019 |

OTHER PUBLICATIONS

OPPO, "Summary on UCI enhancements for URLLC" 3GPP TSG RAN WG1#97 R1-1907683, May 17, 2019, section 4.
International Search Report for the International Patent Application No. PCT/CN2020/106494, mailed Oct. 28, 2020, 2 pages.
Institute for Information Industry, "Remaining Issues on Overlapping of HARQ-ACK and SR," 3GPP TSG RAN WG1 Meeting#92bis, Sanya, China, Apr. 16-20, 2018.
European Search Report for Application No. 20852715 dated Aug. 7, 2023.
3GPP TSG RAN WG1 Meeting #92bis dated Apr. 16-20, 2018.
3GPP TS 38.213 V15.6.0 3 3rd Generation Partnership Project, 2019.
Korean Office Action for Application No. 1020227008086 dated Jan. 23, 2024.
Chinese Notice of the First Review Opinion for CN Application No. 201910749260.1, dated Sep. 18, 2024, 26 pages.
Chinese Search Report for CN Application No. 201910749260.1, dated Sep. 14, 2024, 8 pages.
Chinese Second Office Action for CN Application No. 201910749260.1, dated Jan. 3, 2025, 10 pages.
Chinese Supplementary Search Report for CN Application No. 201910749260.1, dated Jan. 2, 2025, 3 pages.

* cited by examiner

TRANSMISSION METHOD, COMMUNICATION NODE AND MEDIUM

CROSS-REFERENCE TO RELATED APPLICATION(S)

This is a national stage application filed under 37 U.S.C. 371 based on International Patent Application No. PCT/CN2020/106494, filed Aug. 3, 2020, which claims priority to Chinese Patent Application No. 201910749260.1 filed Aug. 14, 2019, the disclosures of which are incorporated herein by reference in their entireties.

FIELD

The present disclosure relates to the field of wireless communication networks, for example, to a transmission method, a transmission apparatus, a communication node and a medium.

BACKGROUND

In the wireless communication technology, in a case where a physical uplink control channel (PUCCH) of a scheduling request (SR) and a PUCCH of hybrid automatic repeat request acknowledgement (HARQ-ACK) information overlap in a time domain, the scheduling request is discarded or delayed. If the scheduling request corresponds to an important service with high priority, for example, an ultra reliable low latency communications (URLLC) service, data transmission and response of the important service are delayed in the event that the scheduling request is discarded or delayed, resulting in poor reliability of wireless communication.

SUMMARY

A transmission method, a transmission apparatus, a communication node, and a medium are provided according to the present disclosure, to improve reliability of wireless communication.

A transmission method is provided according to embodiments of the present disclosure. The method includes:
  in a case where a physical uplink control channel (PUCCH) of a target scheduling request (SR) and a PUCCH of hybrid automatic repeat request acknowledgement (HARQ-ACK) information overlap in a time domain, a transmission mechanism for the target SR and the HARQ-ACK information is determined; and
  a corresponding transmission operation is performed according to the transmission mechanism.

A transmission apparatus is further provided according to embodiments of the present disclosure, which includes:
  a transmission mechanism determination module which is configured to determine a transmission mechanism for a target SR and HARQ-ACK information in a case where a PUCCH of the target SR and a PUCCH of the HARQ-ACK information overlap in a time domain; and
  a transmission module which is configured to perform a corresponding transmission operation according to the transmission mechanism.

A communication node is further provided according to embodiments of the present disclosure, which includes:
  one or more processors; and
  a storage apparatus, which is configured to store one or more programs;
  where the one or more programs, when being executed by the one or more processors, cause the one or more processors to implement the above-described transmission method.

A computer-readable storage medium is further provided according to embodiments of the present disclosure, on which a computer program is stored, the computer program, when being executed by a processor, implements the above-described transmission method.

DETAILED DESCRIPTION

The present disclosure is described hereinafter in conjunction with drawings and embodiments. The embodiments described herein are merely intended to explain rather than limiting the present disclosure. For ease of description, only part, not all, of the structures related to the present disclosure are illustrated in the drawings.

In the wireless communication technology, an SR may be of a PUCCH format 0 (F0) or of a PUCCH format 1 (F1), and transmission mechanisms in the two formats are different. For example, for an SR of format 0, it is required to determine a target sequence to be finally transmitted, and the target sequence is transmitted on a PUCCH resource of the SR, indicating that the SR is a positive SR. For a negative SR, a PUCCH of the SR is not transmitted. For an SR of format 0, a number of resource symbols can only be one or two, and a demodulation reference signal (DMRS) is not needed for resource transmission. For an SR of format 1, a target sequence to be finally transmitted is determined, and a positive SR (corresponding to one bit taken a value of zero) is modulated onto the target sequence, and a modulated target sequence of the SR signal is transmitted on the PUCCH resource of the SR, indicating that the SR is a positive SR, and for a negative SR, a PUCCH of the SR is not transmitted. For an SR of format 1, a number of resource symbols may be 4 to 14, among which some resource symbols carry the DMRS and remaining resource symbols carry the target sequence. In this case, for one user equipment (UE), if PUCCH of one or more SRs is of format 0, and PUCCH of HARQ-ACK information is of format 1, and the PUCCH of the SR and the PUCCH of the HARQ-ACK overlap in a time domain, the SR needs to be discarded, and only the HARQ-ACK information is transmitted. If the discarded SR corresponds to an important service with a high priority, a delay in response to the important service may be caused, resulting in poor reliability.

For example, URLLC services have characteristics of ultra reliability and low latency. In a case where an URLLC service and an enhanced mobile broadband (eMBB) service overlap in a time domain, generally, it is necessary to transmit the URLLC service and discard the eMBB service or delay the transmission of the eMBB service. If an SR PUCCH F0 corresponds to an URLLC service and an HARQ-ACK PUCCH F1 corresponds to an eMBB service, the SR of the URLLC service will be discarded, which is unreasonable. According to a transmission method according to the present embodiments, by determining a reasonable transmission mechanism for the SR PUCCH F0 and the HARQ-ACK PUCCH F1, where the SR PUCCH F0 indicates the PUCCH of the SR is of format 0, and HARQ-ACK PUCCH F1 indicates the PUCCH of the HARQ-ACK information is of format 1, the SR of high-priority service is effectively prevented from being discarded. The transmission method of the present embodiments is described by taking the URLLC service as an example of a high-priority service, and the transmission method is also applicable to cases in which SRs correspond to other types of high-priority services.

Generally, the HARQ-ACK PUCCH F1 has more symbols, for example, twelve symbols, while the SR PUCCH F0 has fewer symbols, for example, only two symbols, and these two symbols overlap first two symbols of the HARQ-ACK PUCCH F1 in a time domain. In this case, the transmission method according to the present embodiments ensures that the transmission of the SR is not delayed by determining a reasonable transmission mechanism for the SR PUCCH F0 and the HARQ-ACK PUCCH F1.

In a case where one HARQ-ACK PUCCH of a UE is in format 0 and one or more SR PUCCHs of the UE are of format 0 or format 1, if there are a positive SR to be transmitted and an HARQ-ACK to be transmitted, the UE may transmit the HARQ-ACK and also the SR simultaneously using the resource of the HARQ-ACK and a cyclic sequence index. According to the protocol, the cyclic sequence index finally transmitted by the UE can indicate that there is a positive SR and there is a corresponding HARQ-ACK, however, the base station can only learn that there is one SR request. If there are multiple SR PUCCHs F0, the base station cannot know for which SR the UE actually initiated the request. In a case where the SRs do not support URLLC services, the base station is required to only respond to the finally transmitted SR. However, in a case where an URLLC service is introduced, and there may be URLLC services in multiple SRs, if the base station still processes the URLLC services according to a conventional flow, it may cause the SRs of the URLLC services to be delayed in response, and finally cause the URLLC service data to be delayed. The transmission method according to the present embodiments ensures that the transmission of SRs of URLLC services may not be delayed by determining a reasonable transmission mechanism for the SR PUCCHs F0 and the HARQ-ACK PUCCH F1.

Figure 1:
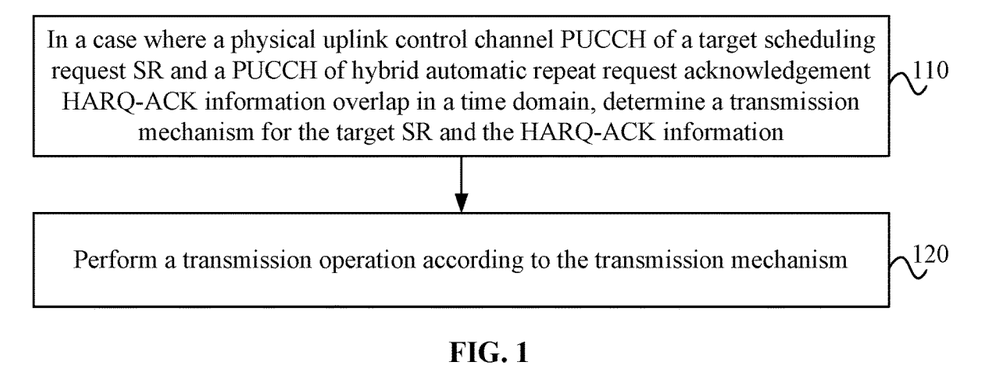
FIG. 1 is a flowchart of a transmission method according to an embodiment.

FIG. 1 is a flowchart of a transmission method according to an embodiment. As shown in FIG. 1, the transmission method according to the present embodiments includes S110 and S120.

In S110, in a case where a PUCCH of a target SR and a PUCCH of HARQ-ACK information overlap in a time domain, a transmission mechanism for the target SR and the HARQ-ACK information is determined.

In S120, a corresponding transmission operation is performed according to the transmission mechanism.

For one UE, there may be one or more positive SRs to be transmitted with PUCCHs overlapping PUCCHs of the HARQ-ACK information in a time domain, and in the related art, the one or more positive SRs may be discarded or the transmission of the positive SRs may be delayed in the case where the positive SRs overlap the HARQ-ACK information in a time domain, resulting in poor communication reliability. In the present embodiments, one of the positive SRs is determined as a target SR, and a transmission mechanism for the target SR and the HARQ-ACK information is determined, thereby ensuring that the necessary SR is not discarded or delayed. For example, a target sequence is transmitted in a PUCCH resource corresponding to the target SR, or a target sequence is transmitted in a PUCCH resource corresponding to the HARQ-ACK information to indicating the target SR. Further, an index value of the target sequence indicates the HARQ-ACK information, thereby ensuring that the target SR is not discarded or delayed. For example, the priorities of the target SR and the HARQ-ACK information are determined, and a transmission mechanism is determined according to a priority relationship between the target SR and the HARQ-ACK information, thereby determining that the target SR is transmitted or discarded, or determining that the HARQ-ACK information is transmitted or discarded, so as to ensure that the target SR, when corresponding to a high priority, is not discarded or delayed.

The transmission method according to the present embodiments may be performed by a UE. Both a serving node (base station) and the UE have to comply with the transmission mechanism. The UE performs a corresponding transmission operation according to the determined transmission mechanism, to transmit or indicate at least one of the target SR and the HARQ-ACK information to the serving node. The serving node may perform a corresponding receiving operation to receive or identify the at least one of the target SR and the HARQ-ACK information according to the transmission mechanism for transmitting the target SR and the HARQ-ACK information by the UE. For example, if the UE transmits a target sequence in a PUCCH resource corresponding to the target SR and indicates the HARQ-ACK information through an index value of the target sequence, the serving node receives the target sequence, i.e., the target SR, and can obtain the corresponding HARQ-ACK information according to the index value of the target sequence, for example, obtain a number of bits of the HARQ-ACK information and values of each the bits of the HARQ-ACK information according to the index value of the target sequence.

In an embodiment, the determining a transmission mechanism for the target SR and the HARQ-ACK information includes determining a first transmission mechanism according to a first sequence index initial value corresponding to the target SR in a case where a PUCCH format 0 of the target SR and a PUCCH format 1 of the HARQ-ACK information overlap in a time domain. The first transmission mechanism includes determining a first target transmission sequence using a first sequence index initial value corresponding to the target SR, and transmitting the first target transmission sequence using a PUCCH format 0 method in a PUCCH resource corresponding to the target SR.

In an embodiment, the determining a first target transmission sequence using a first sequence index initial value corresponding to the target SR includes determining the first target transmission sequence based on a sum of the first sequence index initial value and an index offset, where the index offset is determined based on a number of bits of the HARQ-ACK information and values of the bits of the HARQ-ACK information.

For example, the base station configures a first sequence index initial value for the target SR determined by the UE, the first sequence index initial value is denoted as $m_0$, a first target transmission sequence is determined according to the $m_0$ and an index offset $m_{cs}$, and $m_0+m_{cs}$ is an index of the first target transmission sequence finally transmitted.

In the present embodiments, $m_{cs}$ is related to a number of bits of the HARQ-ACK information and values of the bits of the HARQ-ACK information, and different numbers of the bits and different bit values correspond to different $m_{cs}$.

In an embodiment, in a case where the HARQ-ACK information is one bit, the HARQ-ACK information being a non-acknowledgment (NACK) corresponds to an index offset of 3, and the HARQ-ACK information being an acknowledgment (ACK) corresponds to an index offset of 9; and in a case where the HARQ-ACK information is two bits, the HARQ-ACK information with two bits being in order NACK and NACK corresponds to an index offset of 1, the HARQ-ACK information with two bits being in order NACK and ACK corresponds to an index offset of 4, the HARQ-ACK information with two bits being in order ACK and ACK corresponds to an index offset of 7, and the HARQ-ACK information with two bits being in order ACK and NACK corresponds to an index offset of 10.

Table 1 shows a reference table of an index offset and a bit value of HARQ-ACK information of one bit. As shown in Table 1, the HARQ-ACK information is one bit, and the value of the one bit is 1 or 0 (a value of 1 indicates an ACK, and a value of 0 indicates a NACK). For example, in a case where the HARQ-ACK information is one bit and the bit value is 1, $m_{cs}=9$, thus, the index of the first target transmission sequence finally transmitted is $m_0+9$, and the sequence corresponding to the $m_0+9$ is transmitted on the PUCCH resource of the target SR, thereby indicating that the target SR is positive and indicating that the HARQ-ACK information is an ACK of one bit. The serving node may determine that it is a positive target SR and determine that the HARQ-ACK information is an ACK of one bit according to the received first target transmission sequence. In the present embodiments, the HARQ-ACK information of the format 1 and the information of the target SR are transmitted to the serving node through the PUCCH format 0 of the target SR, so that the target SR is prevented from being discarded, and the reliability of communication in a case where the PUCCHs of the target SR and the HARQ-ACK information overlap in a time domain is improved.

TABLE 1

Reference table of Index Offset and Bit
value of HARQ-ACK information of one bit

| Bit value | 0 | 1 |
|---|---|---|
| $m_{cs}$ | $m_{CS} = 3$ | $m_{CS} = 9$ |

Table 2 shows a reference table of an index offset and bit values of HARQ-ACK information of two bits. As shown in Table 2, the number of bits of the HARQ-ACK information is two, and the value of each of the two bits may be 1 or 0 (a value of 1 indicates an ACK, and a value of 0 indicates a NACK). For example, in a case where the HARQ-ACK information is two bits and bit values of the two bits are in order 1 and 1, $m_{cs}=7$, thus, the index of the first target transmission sequence finally transmitted is $m_0+7$, and the sequence corresponding to the $m_0+7$ is transmitted on the PUCCH resource of the target SR, thereby indicating that the target SR is positive and indicating that the HARQ-ACK information is two bits, being in order ACK and ACK respectively.

TABLE 2

Reference table of Index Offset and Bit Values
of HARQ-ACK information of two bits

| Bit values | {0, 0} | {0, 1} | {1, 1} | {1, 0} |
|---|---|---|---|---|
| $m_{cs}$ | $m_{CS} = 1$ | $m_{CS} = 4$ | $m_{CS} = 7$ | $m_{CS} = 10$ |

In another embodiment, in a case where the HARQ-ACK information is one bit, the HARQ-ACK information being a NACK corresponds to an index offset of 0, and the HARQ-ACK information being an ACK corresponds to an index offset of 6; and in a case where the HARQ-ACK information is two bits, the HARQ-ACK information with two bits being in order NACK and NACK corresponds to an index offset of 0, the HARQ-ACK information with two bits being in order NACK and ACK corresponds to an index offset of 3, the HARQ-ACK information with two bits being in order ACK and ACK corresponds to an index offset of 6, and the HARQ-ACK information with two bits being in order ACK and NACK corresponds to an index offset of 9.

Table 3 shows a reference table of another index offset and a bit value of HARQ-ACK information of one bit. As shown in Table 3, the HARQ-ACK information has one bit, and a value of the one bit is 1 or 0 (a value of 1 indicates an ACK, and a value of 0 indicates a NACK).

TABLE 3

Reference table of Another Index Offset and
Bit value of HARQ-ACK information of one bit

| Bit value | 0 | 1 |
|---|---|---|
| $m_{cs}$ | $m_{CS} = 0$ | $m_{CS} = 6$ |

Table 4 shows a reference table of another index offset and bit values of HARQ-ACK information of two bits. As shown in Table 4, the number of bits of the HARQ-ACK information is two, and a value of each of the two bits may be 1 or 0 (a value of 1 indicates an ACK, and a value of 0 indicates a NACK).

TABLE 4

Another Reference table of Index Offset and Bit
Values of HARQ-ACK information of two bits

| Bit values | {0, 0} | {0, 1} | {1, 1} | {1, 0} |
|---|---|---|---|---|
| $m_{cs}$ | $m_{CS} = 0$ | $m_{CS} = 3$ | $m_{CS} = 6$ | $m_{CS} = 9$ |

In the present embodiments, in a case where the PUCCH format 0 of the target SR corresponds to an URLLC service and the PUCCH format 1 of the HARQ-ACK information corresponds to an eMBB service, if the PUCCH format 1 of the HARQ-ACK information has more symbols (for example, 12 symbols) and the PUCCH format 0 of the target SR has fewer symbols (for example, 2 symbols), and the symbols of the PUCCH format 0 of the target SR and the first two symbols of the PUCCH format 1 of the HARQ-ACK information overlap in a time domain. In this case, if the resource of the PUCCH format 1 of the HARQ-ACK information is used to simultaneously transmit the HARQ-ACK information and the target SR, the target SR information can be obtained only after all the 12 symbols of the PUCCH format 1 of the HARQ-ACK information are received by the serving node, which may cause the target SR to be delayed. With the first transmission mechanism, the PUCCH format 1 of the HARQ-ACK information is discarded and not transmitted, but the HARQ-ACK information is transmitted in the resource of the PUCCH format 0 of the target SR, thereby effectively avoiding the delay issue caused by the simultaneous transmission of the target SR and the HARQ-ACK information, and ensuring that the target SR is transmitted in the original resource without being delayed. The first transmission mechanism may also be understood as that the PUCCH format 1 of the HARQ-ACK information is converted into format 0 for processing, and the number of symbols of the PUCCH format 1 of the HARQ-ACK information is compressed.

Figure 2:
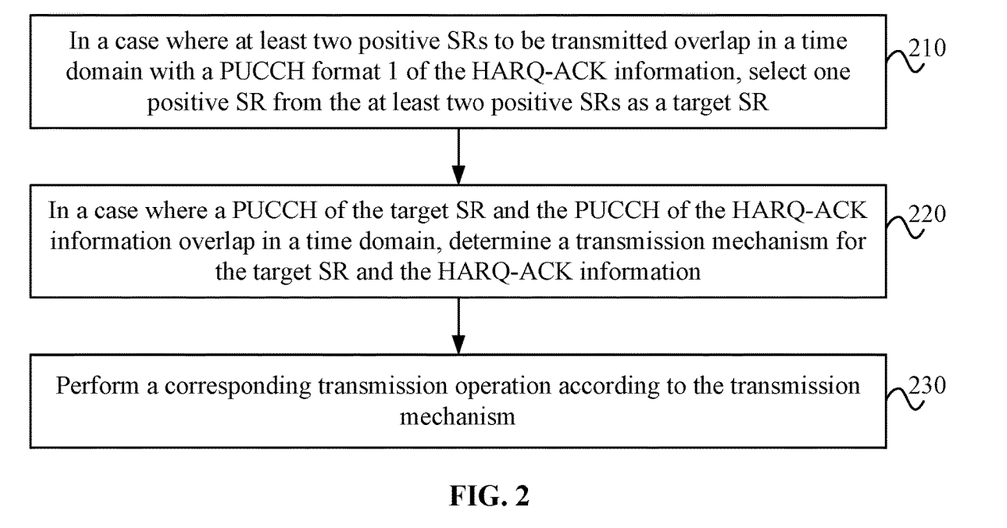
FIG. 2 is another flowchart of the transmission method according to an embodiment.

FIG. 2 is another flowchart of the transmission method according to an embodiment. As shown in FIG. 2, the transmission method according to the present embodiments includes S210, S220 and S230.

In S210, in a case where at least two positive SRs to be transmitted overlap in a time domain with a PUCCH format 1 of the HARQ-ACK information, one of the at least two positive SRs is selected as a target SR.

In S220, in a case where a PUCCH of the target SR and the PUCCH of the HARQ-ACK information overlap in a time domain, a transmission mechanism for the target SR and the HARQ-ACK information is determined.

In S230, a corresponding transmission operation is performed according to the transmission mechanism.

In an embodiment, the selecting one positive SR from the at least two positive SRs as a target SR, includes as follows.

In a case where at least two positive SRs to be transmitted overlap in a time domain with a PUCCH format 1 of the HARQ-ACK information, a positive SR is selected from the at least two positive SRs as the target SR; or, in a case where at least two positive SRs to be transmitted overlap in a time domain with a PUCCH format 1 of the HARQ-ACK information a positive SR with a highest priority is selected from the at least two positive SRs as the target SR according to physical layer priorities of the at least two SRs, or, in a case where the physical layer priorities of the SRs are not provided, a positive SR is selected from the at least two positive SRs as the target SR.

In the present embodiments, for one UE, the base station configures at least two SR PUCCHs F0, and configures an HARQ-ACK PUCCH F1 for the UE. In a case where the resources of the SR PUCCHs F0 and the HARQ-ACK PUCCH F1 overlap in a time domain and there are positive SRs and HARQ-ACK information to be transmitted, the base station and the UE make agreements as follows.

The UE selects one of the positive SRs as the target SR; or, the UE selects a positive SR with the highest priority as the target SR according to physical layer priorities of the SRs; or, the UE selects a positive SR as the target SR if the UE is not provided with information about the physical layer priorities of the SRs.

In an embodiment, the determining a transmission mechanism for the target SR and the HARQ-ACK information includes determining a second transmission mechanism according to a priority corresponding to the target SR and a priority corresponding to the HARQ-ACK information in a case where a PUCCH format 0 of the target SR and a PUCCH format 1 of the HARQ-ACK information overlap in a time domain. In the present embodiments, the priorities of the HARQ-ACK PUCCH F1 and the SR PUCCH F0 are introduced, and the transmission mechanism is determined according to the priorities of the HARQ-ACK PUCCH F1 and the SR PUCCH F0.

In an embodiment, in a case where the target SR corresponds to a high priority and the HARQ-ACK information corresponds to a low priority, only the target SR is transmitted using a PUCCH format 0 method in a PUCCH resource corresponding to the target SR, that is, the HARQ-ACK information is discarded and not transmitted. Alternatively, the first transmission mechanism may be adopted, where a first target transmission sequence is determined using a first sequence index initial value corresponding to the target SR, and the first target transmission sequence is transmitted using a PUCCH format 0 method in a PUCCH resource corresponding to the target SR, thereby indicating the target SR and the number of bits of the HARQ-ACK information and values of the bits of the HARQ-ACK information.

In an embodiment, in a case where the target SR corresponds to a high priority and the HARQ-ACK information corresponds to a high priority, only the HARQ-ACK information is transmitted using a PUCCH format 1 method in a PUCCH resource corresponding to the HARQ-ACK information, that is, the target SR is discarded and not transmitted. Alternatively, the first transmission mechanism may be adopted, where a first target transmission sequence is determined using a first sequence index initial value corresponding to the target SR, and the first target transmission sequence is transmitted using a PUCCH format 0 method in a PUCCH resource corresponding to the target SR, thereby indicating the target SR and the number of bits of the HARQ-ACK information and values of the bits of the HARQ-ACK information.

In a case where the target SR corresponds to a low priority and the HARQ-ACK information corresponds to a low priority, only the HARQ-ACK information is transmitted using the PUCCH format 1 method in the PUCCH resource corresponding to the HARQ-ACK information. In the present embodiments, since the target SR corresponds to a low priority, discarding and not transmitting the target SR may not cause an SR corresponding to a service with a high priority to be discarded or delayed.

In an embodiment, in a case where the target SR corresponds to a low priority and the HARQ-ACK information corresponds to a high priority, only the HARQ-ACK information is transmitted using the PUCCH format 1 method in the PUCCH resource corresponding to the HARQ-ACK information, that is, the target SR is discarded and not transmitted.

In an embodiment, the determining a transmission mechanism for the target SR and the HARQ-ACK information includes determining a third transmission mechanism according to a priority corresponding to the HARQ-ACK information in a case where a PUCCH format 0 of the target SR and a PUCCH format 1 of the HARQ-ACK information overlap in a time domain. In the present embodiments, considering that the SR is initiated by the UE side, the serving node may not know the priority of the SR and cannot agree on the transmission mechanism with the UE, which causes the processing of the serving node side to be too complicated. Therefore, the transmission mechanism for the UE to the target SR and the HARQ-ACK information is determined only according to the priority corresponding to the HARQ-ACK information.

In an embodiment, in a case where the HARQ-ACK information corresponds to a low priority, the first transmission mechanism is employed, that is, a first target transmission sequence is determined using a first sequence index initial value corresponding to the target SR, and the first target transmission sequence is transmitted using a PUCCH format 0 method in a PUCCH resource corresponding to the target SR, thereby indicating the target SR and the number of bits of the HARQ-ACK information and values of the bits of the HARQ-ACK information.

In an embodiment, in a case where the HARQ-ACK information corresponds to a high priority, only the HARQ-ACK information is transmitted using a PUCCH format 1 method in a PUCCH resource corresponding to the HARQ-ACK information, that is, the target SR is discarded and not transmitted. Or in the case where the HARQ-ACK information corresponds to a high priority, a second target transmission sequence may be determined using a second sequence index initial value corresponding to the HARQ-ACK information, and the second target transmission sequence is transmitted using the PUCCH format 1 method in the PUCCH resource corresponding to the HARQ-ACK information, where the second target transmission sequence may be determined according to the second sequence index initial value and an index offset, and the index offset is determined according to the number of bits of the HARQ-ACK information and values of the bits of the HARQ-ACK information.

In an embodiment, in a case where an HARQ-ACK PUCCH F1 is of a high priority, the first transmission mechanism may also be adopted, to indicate the target SR and the number of bits of the HARQ-ACK information and values of the bits of the HARQ-ACK information.

In the present embodiments, the priority corresponding to the HARQ-ACK information in the third transmission mechanism is indicated by the serving node. Therefore, both the serving base station and the UE can learn the priority corresponding to the HARQ-ACK information, and the serving node can determine a sole corresponding transmission mechanism according to the priority, thereby reducing the complexity of processing the received information. In addition, the third transmission mechanism can also ensure that the target SR is transmitted first, in the case where the SR PUCCH F0 is of a high priority and the HARQ-ACK PUCCH F1 is of a low priority.

In an embodiment, a priority corresponding to the HARQ-ACK information is determined according to a priority of an HARQ-ACK codebook indicated by an information domain in a physical downlink control channel (PDCCH); or a priority corresponding to the HARQ-ACK information is determined according to a priority of an HARQ-ACK codebook indicated by a radio network temporary identity (RNTI) scrambled by a cyclic redundancy check (CRC) of the PDCCH; or a priority corresponding to the HARQ-ACK information is determined according to a priority of a hybrid automatic repeat request index corresponding to a physical downlink shared channel (PDSCH), where the priority of a hybrid automatic repeat request index corresponding to the PDSCH is indicated by a media access control (MAC) layer to a physical layer; or, a priority corresponding to the HARQ-ACK information is determined according to priority information of the HARQ-ACK codebook implied in a control resource set (CORESET) to which the PDCCH belongs.

In the related art, the physical layer does not know the priority of an SR. Therefore, in a case where PUCCHs overlap in a time domain, for a PUCCH of an SR, the physical layer always expects to know the priority of the PUCCH of the SR, thereby addressing the multiplexing problem in a case of PUCCHs in the physical layer overlapping in time domain.

In an embodiment, a priority corresponding to a target SR in a physical layer may be determined in the following manners.

A priority corresponding to a target SR in a physical layer is determined according to a priority of the target SR indicated by an MAC layer to the physical layer. For example, through agreements in protocols, the MAC layer, while instructing the physical layer to transmit a target SR, indicates to the physical layer a priority of a logical channel corresponding to the target SR as the priority of the target SR in the physical layer. In this case, the physical layer, upon receiving a target SR instructed by the MAC layer to transmit, the priority of the target SR can be known. A priority corresponding to a target SR in a physical layer may also be determined according to relationships between each of a period of a PUCCH resource of the target SR and a number of symbols of the PUCCH resource of the target SR and respective thresholds. For example, in a case where the period of the target SR is less than a first threshold, the target SR corresponds to a high priority; and further for example, in a case where the number of symbols of the target SR is less than a second threshold, the target SR corresponds to a high priority, and the like, for example, an SR will corresponds to a higher priority if its period is lesser, and an SR will corresponds to a higher priority if the number of its symbols is fewer, which may also be understood as that a priority corresponding to a target SR in a physical layer is determined according to the priority of the target SR defined by the physical layer. A priority corresponding to a target SR in a physical layer may also be determined according to the priority of the target SR indicated by indication information in configuration information of radio resource control (RRC) of the target SR.

In the present embodiments, a priority of an SR may be a priority corresponding to a logical channel corresponding to the SR, or may be a priority corresponding to a logical channel group corresponding to the SR, or may be a highest priority of a logical channel in logical channels included in a MAC protocol data unit (PDU) of a data packet to be transmitted corresponding to the SR.

In an embodiment, operations performed in the MAC layer are: determining a priority of a SR according to a priority of a logical channel corresponding to the SR, and indicating the priority of the SR to a physical layer; or determining a priority of a SR according to a priority of a service type corresponding to the SR, and indicating the priority of the SR to a physical layer; or determining a priority of a SR according to a predefined priority reference table, and indicating the priority of the SR to a physical layer. In the present embodiments, in the MAC layer, the priorities of the respective SRs are determined and indicated to the physical layer, whereby the UE may determine the priority of the target SR.

In the present embodiments, taking the SR as an example, the SR corresponding to a high priority may be defined as the SR corresponding to a logical channel of a high priority, the SR corresponding to an URLLC service, or the SR corresponding to a high priority according to a specified priority table. Correspondingly, the SR corresponding to a low priority may be defined as the SR corresponding to a logical channel of a low priority, the SR corresponding to an eMBB service, or the SR corresponding to a low priority according to the specified priority table.

In an embodiment, determining a transmission mechanism for the target SR and the HARQ-ACK information includes determining a fourth transmission mechanism according to a third sequence index initial value corresponding to the HARQ-ACK information in a case where a PUCCH of the target SR and a PUCCH format 0 of the HARQ-ACK information overlap in a time domain.

In the present embodiments, the fourth transmission mechanism includes determining a third target transmission sequence using the third sequence index initial value corresponding to the HARQ-ACK information, and transmitting the third target transmission sequence using a PUCCH format 0 method in a PUCCH resource corresponding to the HARQ-ACK information.

In the present embodiments, the target SR is an SR with the highest priority of at least one positive SR.

For one UE, the serving node configures one or multiple SR PUCCHs F0 (or F1) and configures an HARQ-ACK PUCCH F0 for the UE. In a case where PUCCHs of the SR PUCCH F0 (or F1) and the HARQ-ACK PUCCH F1 overlap in a time domain and there is one or more positive SRs and HARQ-ACK information to be transmitted, the serving node and the UE agree as follows. The UE selects an SR with the highest priority among positive SR requests as a target SR to be transmitted, uses a resource of the HARQ-ACK PUCCH F0, and determines an index corresponding to a target sequence finally transmitted according to a third sequence index initial value of the HARQ-ACK PUCCH F0, thereby transmitting the third target transmission sequence corresponding to the index to indicate the SR being a positive SR and the number of bits of the HARQ-ACK information and values of the bits of the HARQ-ACK information. The serving node, that is, the base station side, considers that in this case, the target SR reported by the UE has a high priority, for example, the serving node always considers the target SR as an SR corresponding to the URLLC service, and makes corresponding processing, which ensures the reliability of the URLLC service, effectively avoids treating an SR of an URLLC service as an SR of an eMBB service and avoids causing the target SR to be delayed accordingly.

In the above embodiment, URLLC services have higher timeliness and reliability requirements than eMBB services. An SR corresponding to an URLLC service or HARQ-ACK information corresponding to an URLLC service or a PUSCH corresponding to an URLLC service may represent the SR with high priority, the HARQ-ACK information with high priority, or the PUSCH with high priority, respectively.

In an embodiment, the determining a second target transmission sequence using a second sequence index initial value corresponding to the HARQ-ACK information includes determining the second target transmission sequence according to a sum of the second sequence index initial value and an index offset, where the index offset is determined according to the number of bits of the HARQ-ACK information and values of the bits of the HARQ-ACK information. Regarding the method for determining the index offset, reference may be made to the above embodiments.

In an embodiment, the determining a third target transmission sequence using a third sequence index initial value corresponding to the HARQ-ACK information includes determining the third target transmission sequence according to a sum of the third sequence index initial value and an index offset, where the index offset is determined according to the number of bits of the HARQ-ACK information and values of the bits of the HARQ-ACK information. Regarding the method for determining the index offset, reference may be made to the above embodiments.

According to the transmission method of the present embodiments, by determining a reasonable transmission mechanism for the SR PUCCH F0 and the HARQ-ACK PUCCH F1, the UE can simultaneously indicate the two types of information to the base station by using the PUCCH resource of the target SR or the PUCCH resource of HARQ-ACK information, ensuring that the target SR corresponding to the high priority is not discarded or delayed in transmission, thereby improving the reliability of the wireless communication.

In an embodiment, in a case where PUCCH F2/F3/F4 of HARQ-ACK information or PUCCH F2/F3/F4 of channel state information (CSI) overlaps PUCCH F0/F1 of one or multiple SRs in time domain, the SRs are ordered in an ascending order according to SR index identifiers (IDs), and then signaling bits (also referred as SR bits in the present embodiments for convenience of description) are used to describe which SR(s) is/are positive SR(s), and the signaling bit of 0 is used to indicate that none of the SRs is positive. On this basis, the HARQ-ACK/CSI bits and the SR bits are stringed together and then multiplexed in the HARQ-ACK/CSI PUCCH F2/F3/F4 to be transmitted.

In a case where an URLLC service is introduced, the HARQ-ACK or SR related to the URLLC service requires high timeliness, and it is desirable to reduce delay of their transmission time as much as possible. In the present embodiments, a certain condition is set such that multiplexing is allowed to perform only when the certain condition is met. Thus, the requirement of timeliness is met.

In an embodiment, the base station and the UE agree to set a condition on the number of symbols, for example, it is set to allow the multiplexing to be performed when the number of symbols transmitted in the HARQ-ACK/CSI PUCCH F2/3/4 is less than (or equal to) N.

In an embodiment, the base station and the UE agree that in a case where multiple uplink physical channels overlap in a time domain, if the multiple uplink physical channels are to be multiplexed in a new uplink physical channel (the new uplink physical channel may be one of the multiple uplink physical channels), and the number of symbols therefore transmitted in the new uplink physical channel does not exceed N, the multiple uplink physical channels are allowed to be multiplexed into the new uplink physical layer channel; otherwise, the multiple uplink physical channels are not allowed to be multiplexed, and the uplink physical channel with a low priority is discarded, and the uplink physical channel with a high priority is transmitted.

In an embodiment, N may be a predetermined value, e.g., N is 2 or 4 or 7.

In an embodiment, N may also be agreed according to different subcarrier spacings of the uplink physical channel, because the length of a symbol is determined according to a size of a subcarrier spacing. For example, in a case of 15 KHz subcarrier spacing, N is set as 2; in a case of 30 KHz subcarrier spacing, N is set as 4; and in a case of 60 KHz carrier spacing, N is set as 7.

In an embodiment, taking N as 2 as an example, multiple uplink physical channels overlap in a time domain, for example, a CSI PUCCH of an eMBB service (corresponding to a low-priority uplink physical channel, here it may also be an HARQ-ACK PUCCH or SR PUCCH, the principles of processing are consistent) of a UE and an SR PUCCH of an URLLC service (corresponding to a high-priority uplink physical channel, here it may also be an HARQ-ACK PUCCH, and the principles of processing are consistent) of the UE overlap in a time domain, and in this case, the UE is required to multiplex the CSI PUCCH and the SR PUCCH into a new PUCCH, and according to an agreement between the base station and the UE, the UE determines whether the number of symbols of the new PUCCH exceeds 2, and if the number of symbols in the new PUCCH does not exceed 2, the UE multiplexes the CSI in the CSI PUCCH and the SR in the SR PUCCH into the new PUCCH; and if the number of symbols in the new PUCCH exceeds 2, the UE discards CSI PUCCH (corresponding to the low-priority uplink physical channel) and transmits the SR PUCCH (corresponding to the high-priority uplink physical channel).

In an embodiment, taking N as 2 as an example, multiple uplink physical channels overlap in a time domain, for example, a PUSCH of an eMBB service (corresponding to a low-priority uplink physical channel) of a UE and an SR PUCCH (here it may also be an HARQ-ACK PUCCH, and the principles of processing are consistent) of an URLLC service (corresponding to a high-priority uplink physical channel) of the UE overlap in a time domain, and in this case, it is required to multiplex the SR in the SR PUCCH into the PUSCH, and according to an agreement between the base station and the UE, the UE determines whether the number of symbols in the PUSCH exceeds 2, and if the number of symbols in the PUSCH does not exceed 2, the UE multiplexes the SR into the PUSCH; and if the number of symbols in the PUSCH exceeds 2, the UE discards the PUSCH and transmits the SR PUCCH.

In the present embodiments, since it is specified in the new radio (NR) system that the PUCCHs are classified into two types, and in a first category, the number of symbols is no more than 2, and in a second type, the number of symbols is no less than 4. Therefore, it is also possible to distinguish the above values of N directly according to the PUCCH types. For example, in a case where the new PUCCH is of the first type, the multiple uplink physical channels are allowed to be multiplexed into the new PUCCH; otherwise, the low-priority channels of the multiple uplink physical channels are discarded and the high-priority channels of the multiple uplink physical channels are transmitted.

In the present embodiments, after the multiple uplink physical channels are multiplexed, the total number of bits of uplink control information (UCI) to be transmitted increases. Where, the UCI includes HARQ-ACK information, CSI, and an SR. Compared with a case where only the uplink physical channels of high priority are transmitted, the transmission performance of information in the uplink physical channels with high priority may be degraded in the case of the multiplexed UCI transmission. Regarding this, the following embodiments can be used for processing.

In an embodiment, the base station and the UE agree to configure a corresponding code rate for the transmission of a high-priority uplink physical channel and a corresponding code rate for the transmission of a low-priority uplink physical channel, respectively, and agree, when it is determined, according to the above conditions, that the multiplexing is allowed, the multiplexed UCI uses the code rate configured for the transmission of the high-priority uplink physical channel. In this case, the UCI in the low-priority uplink physical channel, when being multiplexed, is transmitted by using the code rate corresponding to the high-priority uplink physical channel. In the present embodiments, for the power control parameters used in the process of transmission of the multiplexed new PUCCH, it may also adopt a processing mechanism similar to that of the code rate. The base station and the UE agree to configure a corresponding power control parameter for the transmission of a high-priority uplink physical channel and a corresponding power control parameter for the transmission of a low-priority uplink physical channel, respectively, and agree, when it is determined, according to the above conditions, that the multiplexing is allowed, the multiplexed UCI uses the power control parameter configured in the transmission of the high-priority uplink physical channel, that is, in this case, the UCI in the low-priority uplink physical channel, when being multiplexed, is transmitted by using the power control parameter corresponding to the high-priority uplink physical channel.

Figure 3:
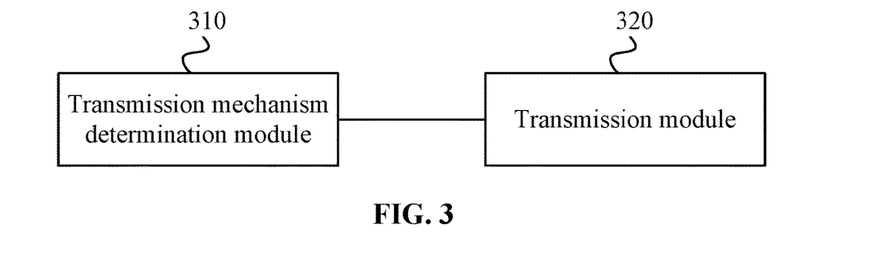
FIG. 3 is a schematic structural diagram of a transmission apparatus according to an embodiment.

A transmission apparatus is further provided according to embodiments of the present disclosure. FIG. 3 is a schematic structural diagram of a transmission apparatus according to an embodiment. As shown in FIG. 3, the transmission apparatus includes a transmission mechanism determination module 310 and a transmission module 320.

The transmission mechanism determination module 310 is configured to determine a transmission mechanism for an SR and HARQ-ACK information in a case where a PUCCH of the target SR and a PUCCH of the HARQ-ACK information overlap in a time domain.

The transmission module 320 is configured to perform a corresponding transmission operation according to the transmission mechanism.

In an embodiment, the transmission mechanism determination module 310 includes a first mechanism determination module.

The first mechanism determination module is configured to determine a first transmission mechanism according to a first sequence index initial value corresponding to a target SR in a case where a PUCCH format 0 of the target SR and a PUCCH format 1 of HARQ-ACK information overlap in a time domain.

The first transmission mechanism includes as follows.

A first target transmission sequence is determined using a first sequence index initial value corresponding to the target SR, and the first target transmission sequence is transmitted using a PUCCH format 0 method in a PUCCH resource corresponding to the target SR.

In an embodiment, the apparatus further includes a target scheduling request determination module.

The target scheduling request determination module is configured to, in a case where at least two positive SRs to be transmitted overlap in a time domain with a PUCCH format 1 of the HARQ-ACK information, select a positive SR from the at least two positive SRs as the target SR; or, in a case where at least two positive SRs to be transmitted overlap in a time domain with a PUCCH format 1 of the HARQ-ACK information, select a positive SR with a highest priority as the target SR according to physical layer priorities of the at least two SRs, or, in a case where the physical layer priorities of the SRs are not provided, select a positive SR from the at least two positive SRs as the target SR.

In an embodiment, the transmission mechanism determination module 310 includes a second mechanism determination module.

The second mechanism determination module is configured to determine a second transmission mechanism according to a priority corresponding to the target SR and a priority corresponding to the HARQ-ACK information in a case where a PUCCH format 0 of the target SR and a PUCCH format 1 of the HARQ-ACK information overlap in a time domain.

In an embodiment, the second transmission mechanism includes as follows.

In a case where the target SR corresponds to a high priority and the HARQ-ACK information corresponds to a low priority, only the target SR is transmitted using a PUCCH format 0 method in a PUCCH resource corresponding to the target SR, or a first target transmission sequence is determined using a first sequence index initial value corresponding to the target SR, and the first target transmission sequence is transmitted using a PUCCH format 0 method in a PUCCH resource corresponding to the target SR.

In a case where the target SR corresponds to a high priority and the HARQ-ACK information corresponds to a high priority, only the HARQ-ACK information is transmitted using a PUCCH format 1 method in a PUCCH resource corresponding to the HARQ-ACK information, or a first target transmission sequence is determined using a first sequence index initial value corresponding to the target SR, and the first target transmission sequence is transmitted using a PUCCH format 0 method in a PUCCH resource corresponding to the target SR.

In a case where the target SR corresponds to a low priority and the HARQ-ACK information corresponds to a low priority, only the HARQ-ACK information is transmitted using the PUCCH format 1 method in the PUCCH resource corresponding to the HARQ-ACK information.

In a case where the target SR corresponds to a low priority and the HARQ-ACK information corresponds to a high priority, only the HARQ-ACK information is transmitted using the PUCCH format 1 method in the PUCCH resource corresponding to the HARQ-ACK information.

In an embodiment, the transmission mechanism determination module 310 includes a third mechanism determination module.

The third mechanism determination module is configured to determine a third transmission mechanism according to a priority corresponding to the HARQ-ACK information in a case where a PUCCH format 0 of the target SR and a PUCCH format 1 of the HARQ-ACK information overlap in a time domain.

In an embodiment, the third transmission mechanism includes as follows.

In a case where the HARQ-ACK information corresponds to a low priority, a first target transmission sequence is determined using a first sequence index initial value corresponding to the target SR, and the first target transmission sequence is transmitted using a PUCCH format 0 method in a PUCCH resource corresponding to the target SR.

In a case where the HARQ-ACK information corresponds to a high priority, only the HARQ-ACK information is transmitted using a PUCCH format 1 method in a PUCCH resource corresponding to the HARQ-ACK information, or in a case where the HARQ-ACK information corresponds to a high priority, a second target transmission sequence is determined using a second sequence index initial value corresponding to the HARQ-ACK information, and the second target transmission sequence is transmitted using the PUCCH format 1 method in the PUCCH resource corresponding to the HARQ-ACK information.

In an embodiment, a priority corresponding to the HARQ-ACK information is determined according to a priority of an HARQ-ACK codebook indicated by an information domain in a PDCCH, a priority corresponding to the HARQ-ACK information is determined according to a priority of an HARQ-ACK codebook indicated by a radio network temporary identifier RNTI scrambled by a cyclic redundancy check CRC of the PDCCH, a priority corresponding to the HARQ-ACK information is determined according to a priority of a hybrid automatic repeat request index corresponding to a PDSCH, where the priority of a hybrid automatic repeat request index corresponding to the PDSCH is indicated by a MAC layer to a physical layer, or, a priority corresponding to the HARQ-ACK information is determined according to priority information of the HARQ-ACK codebook implied in a control resource set CORESET to which the PDCCH belongs.

In an embodiment, the transmission mechanism determination module 310 includes a fourth mechanism determination module.

The fourth mechanism determination module is configured to determine a fourth transmission mechanism according to a third sequence index initial value corresponding to the HARQ-ACK information in a case where a PUCCH of the target SR and a PUCCH format 0 of the HARQ-ACK information overlap in a time domain.

The fourth transmission mechanism includes as follows.

A third target transmission sequence is determined using the third sequence index initial value corresponding to the HARQ-ACK information, and the third target transmission sequence is transmitted using a PUCCH format 0 method in a PUCCH resource corresponding to the HARQ-ACK information.

In an embodiment, the target SR is an SR with a highest priority of at least one positive SR.

In an embodiment, the priority corresponding to the target SR is determined according to:
   a priority of the target SR indicated by a media access control MAC layer to a physical layer; or relationships between each a period of a PUCCH resource of the target SR and a number of symbols of the PUCCH resource of the target SR and respective thresholds; or a priority of a target SR indicated by indication information in configuration information of radio resource control RRC of the target SR.
   Where, operations performed in the MAC layer are:
   determining a priority of the SR according to a priority of a logical channel corresponding to the SR, and indicating the priority of the SR to a physical layer; determining a priority of the SR according to a priority of a service type corresponding to the SR, and indicating the priority of the SR to a physical layer; or, determining a priority of the SR according to a predefined priority reference table, and indicating the priority of the SR to a physical layer.

In an embodiment, the determining a first target transmission sequence using a first sequence index initial value corresponding to the target SR includes:
   determining the first target transmission sequence based on a sum of the first sequence index initial value and an index offset, where the index offset is determined the number of bits of the HARQ-ACK information and values of the bits of the HARQ-ACK information based on a number of bits of the HARQ-ACK information and values of the bits of the HARQ-ACK information.

In an embodiment, the determining a second target transmission sequence using a second sequence index initial value corresponding to the HARQ-ACK information includes:
   determining the second target transmission sequence based on a sum of the second sequence index initial value and an index offset, where the index offset is determined based on a number of bits of the HARQ-ACK information and values of the bits of the HARQ-ACK information.

In an embodiment, the determining a third target transmission sequence using a third sequence index initial value corresponding to the HARQ-ACK information includes:
   determining the third target transmission sequence based on a sum of the third sequence index initial value and an index offset, where the index offset is determined based on a number of bits of the HARQ-ACK information and values of the bits of the HARQ-ACK information.

In an embodiment, in a case where the HARQ-ACK information is one bit, the HARQ-ACK information being a non-acknowledgment NACK corresponds to an index offset of 3, and the HARQ-ACK information being an acknowledgment ACK corresponds to an index offset of 9; and in a case where the HARQ-ACK information is two bits, the HARQ-ACK information with two bits being in order NACK and NACK corresponds to an index offset of 1, the HARQ-ACK information with two bits being in order NACK and ACK corresponds to an index offset of 4, the HARQ-ACK information with two bits being in order ACK and ACK corresponds to an index offset of 7, and the HARQ-ACK information with two bits being in order ACK and NACK corresponds to an index offset of 10; or, in a case where the HARQ-ACK information is one bit, the HARQ-ACK information being a non-acknowledgment NACK corresponds to an index offset of 0, and the HARQ-ACK information being an acknowledgment ACK corresponds to an index offset of 6; and in a case where the HARQ-ACK information is two bits, the HARQ-ACK information with two bits being in order NACK and NACK corresponds to an index offset of 0, the HARQ-ACK information with two bits being in order NACK and ACK corresponds to an index offset of 3, the HARQ-ACK information with two bits being in order ACK and ACK corresponds to an index offset of 6, and the HARQ-ACK information with two bits being in order ACK and NACK corresponds to an index offset of 9.

In the transmission apparatus according to the present embodiments, the transmission mechanism determination module determines a reasonable transmission mechanism for the SR PUCCH F0 and the HARQ-ACK PUCCH F1, and the transmission module executes a corresponding transmission operation, such that the UE can simultaneously indicate the two types of information to the base station by using the PUCCH resource of the target SR or HARQ-ACK information, ensure that the target SR corresponding to a high priority is not discarded or delayed in transmission, thereby improving the reliability of the wireless communication.

A communication node is further provided according to embodiments of the present disclosure. The transmission method may be performed by a transmission apparatus which may be embodied in software and/or hardware and integrated in the communication node. The communication node is a first user equipment that transmits a reference signal of side link channel state information.

Figure 4:
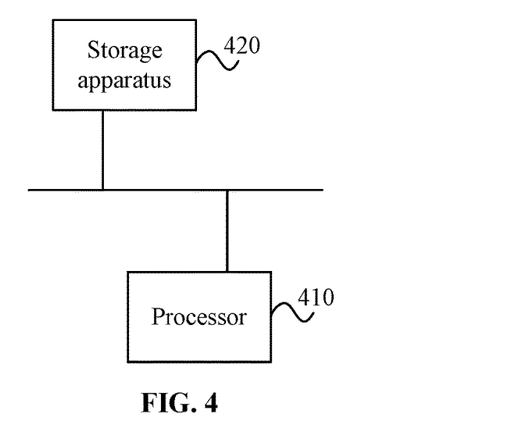
FIG. 4 is a schematic structural diagram of a communication node according to an embodiment.

FIG. 4 is a schematic structural diagram of a communication node according to an embodiment. As shown in FIG. 4, the communication node according to the present embodiments includes a processor 410 and a storage apparatus 420. There may be one or more processors in the communication node. In FIG. 4, one processor 410 is taken as an example. The processor 410 and the storage apparatus 420 in the communication node may be connected through a bus or other means, and in FIG. 4, connecting through a bus is taken as an example.

The one or more programs, when being executed by the one or more processors 410, cause the one or more processors to implement the transmission method according to any one of the above embodiments.

The storage apparatus 420 in the communication node, as a computer-readable storage medium, may be used to store one or more programs, the programs may be software programs, computer-executable programs, and modules, such as program instructions/modules corresponding to the transmission method in an embodiment of the present disclosure (e.g., modules in the transmission apparatus shown in FIG. 3, including a transmission mechanism determination module 310 and a transmission module 320). The processor 410 executes software programs, instructions, and modules stored in the storage apparatus 420 to perform various functional applications and data processing of the communication node, that is, implement the transmission method in the above-described method embodiments.

The storage apparatus 420 mainly includes a program storage area and a data storage area, where the program storage area may store an operating system, an application program required for at least one function; the data storage area may store data or the like created according to use of the apparatus (such as a scheduling request, the HARQ-ACK information, and the like in the above-described embodiments). Further, the storage apparatus 420 may include a high-speed random access memory, and may further include a non-volatile memory, such as at least one magnetic disk storage apparatus, a flash memory apparatus, or other non-volatile solid-state storage apparatus. In some embodiments, the storage apparatus 420 may include one or more memories remotely disposed relative to the one or more processors 410, these memories may be connected to the communication node through a network. Examples of the above network include, but are not limited to, the internet, an intranet, a local area network, a mobile communication network, or combinations thereof.

Further, the one or more programs included in the above-mentioned communication node, when being executed by the one or more processors 410, implement the following operations: determining a transmission mechanism for an SR and HARQ-ACK information in a case where a PUCCH of the target SR and a PUCCH of the HARQ-ACK information overlap in a time domain; performing a corresponding transmission operation according to the transmission mechanism.

The communication node provided in the present embodiments pertains to a same concept as the transmission method provided in the foregoing embodiments. For technical details not described in detail in the present embodiments, reference may be made to any of the foregoing embodiments, and the present embodiments have same effect as performing the transmission method.

In an embodiment, for a UE, there are two carriers in a case of frequency division duplexing (FDD), one is a downlink (DL) carrier, the other is an uplink (UL) carrier, and the two carriers have different subcarrier spacings (SCSs).

Figure 5:
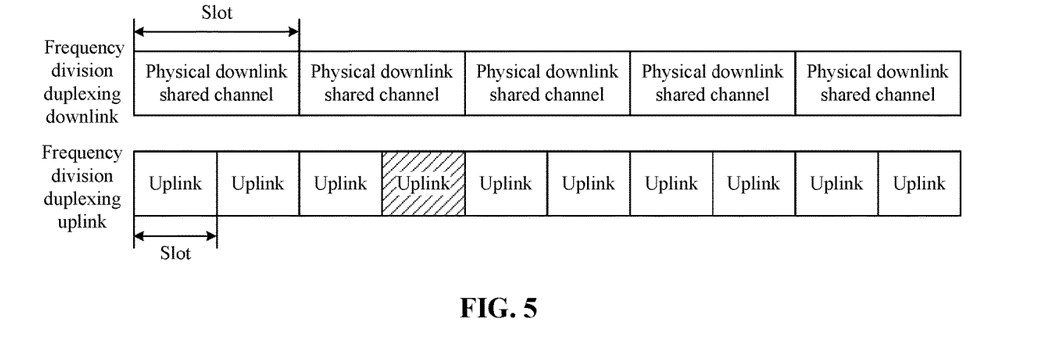
FIG. 5 is a schematic diagram of a time slot determination according to an embodiment.

FIG. 5 is a schematic diagram of time slot determination according to an embodiment. As shown in FIG. 5, an SCS of the DL carrier is 15 Khz, and an SCS of the UL carrier is 30 KHz. In a case where a physical downlink shared channel PDSCH of the UE is scheduled in a time slot (slot) n, a physical uplink control channel PUCCH of an HARQ-ACK corresponding to the PDSCH may be transmitted in a time slot n+k, where k is a non-negative integer and is notified by the network side. The slot of k=0 is defined as a last slot of slots with which PDSCHs overlap and in which PUCCHs are transmitted. The slots in which PUCCHs are transmitted can be understood as each slot having an opportunity for PUCCHs to be transmitted as long as it is an uplink slot. For example, a second PDSCH in FIG. 5 is scheduled for the UE, and an HARQ-ACK PUCCH corresponding to the PDSCH is configured to be transmitted in the slot n+k. In this case, the number of slots with which PDSCHs overlap and in which PUCCHs are transmitted is two. For an uplink slot, once an HARQ-ACK PUCCH corresponding to the PDSCH is indicated to be transmitted in a slot, this slot allows the PUCCH to be transmitted therein. In this case, it is determined that the slot of k=0 is the last slot of slots with which PDSCHs overlap and in which PUCCHs are transmitted, i.e., the slot corresponding to the UL carrier marked with slashes in FIG. 5.

Figure 6:
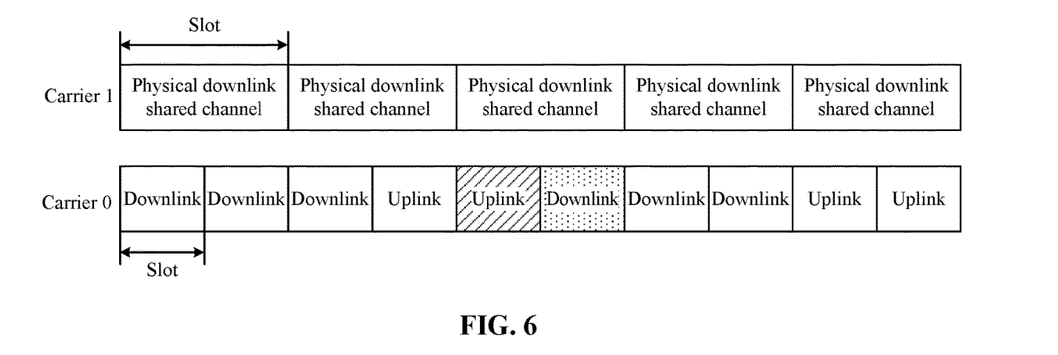
FIG. 6 is another schematic diagram of the time slot determination according to an embodiment.

FIG. 6 is another schematic diagram of the time slot determination according to an embodiment. In a case where two carriers are configured for the UE, which are carrier 1 being FDD or time division duplex (TDD) and having an SCS of 15 KHz, and carrier 0 being TDD and having an SCS of 30 KHz. The operations of the two carriers are as shown in FIG. 6. In a case where an HARQ-ACK PUCCH corresponding to a third PDSCH in FIG. 6 is transmitted in a slot n+k, the slot of k=0 is determined according to the above embodiment as a slot corresponding to the UL carrier and marked by slashes in FIG. 6. In this case, a downlink slot adjacent thereto is not selected due to that a PUCCH is not allowed to be transmitted therein. That is, there are two slots overlapping the third PDSCH in FIG. 6, but only one slot (i.e., the first slot of the two slots) allows a PUCCH to be transmitted therein. In this case, a position of the slot of k=0 is later than that of the PDSCH, which causes that the slot of k=0 is actually not used, wasting a possible value of k. On the basis of determining the slot of k=0, k slots counted subsequent to the slot of k=0 are the slots in which the HARQ-ACK PUCCH is transmitted.

In an embodiment, for a first PDSCH in FIG. 6, if the HARQ-ACK PUCCH corresponding to the first PDSCH is configured to be transmitted in the slot n+k, the slot of k=0 cannot be determined. Since in this case, there are two slots overlapping the PDSCH, but the two slots do not allow PUCCHs to be transmitted therein, the slot of k=0 cannot be determined. Similarly, such issue may also occur in a feed-back to an HARQ-ACK PUCCH corresponding to a PDCCH which is released by a semi-persistent scheduling (SPS) PDSCH.

Solutions to the above issue are given in the following embodiments.

In an embodiment, the serving node and the UE agree that: if the UE has detected downlink control information (DCI) which schedules a PDSCH and an end of the PDSCH being in a slot n (in the carrier 1), or if the UE have detected a PDCCH having an end in slot n and for indicating an SPS PDSCH release (in the carrier 1), the UE feeds back, in the slot n+k, the PDSCH and an HARQ-ACK PUCCH corresponding to the PDCCH (and the PUCCH is transmitted in the carrier 0). In which, k is the number of slots (k is a non-negative integer) and is notified by a timing indicator domain from the PDSCH to the HARQ-ACK in the DCI, or is obtained through a higher layer signaling in a case where the timing indicator domain does not exist. In the present embodiments, it is agreed that the slot of k=0 is a last slot of slots which overlap the PDSCH or the PDCCH and which belong to slots of the carrier in which the PUCCH is located. Herein, the slots overlapping the PDSCH means the slots overlapping symbols occupied by the PDSCH rather than overlapping a slot in which the PDSCH is located.

The aforementioned PDSCH and the aforementioned PDCCH are transmitted in the carrier 1 or in a band width part 1 (BWP1) of the carrier, and the aforementioned PUCCH is transmitted in the carrier 0 or a BWP2. The BWP1 and BWP2 may belong to a same carrier. The carrier 1 and the carrier 0 may have a same subcarrier spacing or different subcarrier spacings. The BWP1 and the BWP2 may have a same subcarrier spacing or different subcarrier spacings.

In an embodiment, as shown in FIG. 6, the subcarrier spacing of the carrier 1 carrying the PDSCH is 15 KHz, and the subcarrier spacing of the carrier 0 carrying the PUCCH is 30 KHz. For example, the HARQ-ACK PUCCH corresponding to the third PDSCH in carrier 1 will be transmitted in a slot n+3 (in this case, it is equivalent to k=3) and in the carrier 0. The base station and the UE agree that: the slot of k=0 is located on a carrier in which the HARQ-ACK PUCCH is determined to transmit, i.e., the carrier 0. In the carrier 0, the last slot of slots overlapping the PDSCH (or overlapping a slot in which the PDSCH is located), in a case where the PDSCH occupies only first few symbols in the slot, overlapping the PDSCH and overlapping the slot in which the PDSCH is located will leads to different results. In FIG. 6, there are two slots that overlap the PDSCH and belong to the carrier 0 where the HARQ-ACK PUCCH is located, and the two slots are, in order, an UL slot and a DL slot, respectively. In this case, the slot of k=0 is the DL slot (a slot corresponding to a dot-marked area of the carrier) of the two slots in the carrier 0, and three slots which are counted subsequent to the slot of k=0 in the carrier 0 serves as the slots in which the HARQ-ACK PUCCH corresponding to the PDSCH is transmitted. In this manner, although the slot of k=0 is a DL slot, it is still treated as the slot of k=0.

A storage medium including computer executable instructions is further provided according to embodiments of the present disclosure, and the computer executable instructions, when being executed by a computer processor, are configured to perform the transmission method according to the above embodiments of the present disclosure.

From the above description regarding the embodiments, those skilled in the art may understand that the present disclosure may be implemented in a form of software and general hardware, or in a form of hardware. The technical solutions of the present disclosure may be embodied in a form of a software product, and the computer software product may be stored in a computer-readable storage medium, such as a floppy disk, a read-only memory (ROM), a random access memory (RAM), a flash memory, a hard disk, or an optical disc of the computer, and may include multiple instructions for enable a computer device, which may be a personal computer, a server, or a network device, to perform the method described in any embodiment of the present disclosure.

The above are only exemplary embodiments of the present disclosure and are not intended to limit the scope of protection of the present disclosure.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A transmission method, comprising:
   in response to a physical uplink control channel (PUCCH) of first uplink control information (UCI) with a high-priority and a PUCCH of second UCI with a low-priority overlap in a time domain, performing a transmission using one designated PUCCH,
   wherein the first UCI and the second UCI are multiplexed into the one designated PUCCH, and the transmission of the one designated PUCCH is transmitted by using a power based on a power control parameter associated with the first UCI with the high-priority, wherein the second UCI with the low-priority, when being multiplexed, is transmitted by using the power control parameter associated with the first UCI with the high-priority; and
   wherein each of the first UCI and the second UCI comprises at least one of hybrid automatic repeat request acknowledgement (HARQ-ACK) information or a scheduling request (SR);
   a priority of the SR is indicated by indication information in configuration information of radio resource control (RRC) of the SR; and
   a priority corresponding to the HARQ-ACK information is determined according to a priority of an HARQ-ACK codebook indicated by an information domain in a physical downlink control channel (PDCCH).

2. The method of claim 1, wherein in response to the first UCI and the second UCI are the SR and the HARQ-ACK information, respectively, the method further comprises:
   in a case where a PUCCH of a target SR and a PUCCH of HARQ-ACK information overlap in a time domain, determining a transmission mechanism for the target SR and the HARQ-ACK information; and
   performing a transmission operation according to the transmission mechanism.

3. The method of claim 2, wherein the determining a transmission mechanism for the target SR and the HARQ-ACK information comprises:
   in a case where a PUCCH format 0 of the target SR and a PUCCH format 1 of the HARQ-ACK information overlap in a time domain, determining a first transmission mechanism according to a first sequence index initial value corresponding to the target SR;
   wherein the first transmission mechanism comprises:
   determining a first target transmission sequence using a first sequence index initial value corresponding to the target SR, and transmitting the first target transmission sequence using a PUCCH format 0 method in a PUCCH resource corresponding to the target SR.

4. The method of claim 3, further comprising:
   in a case where at least two positive SRs are to be transmitted, selecting a positive SR from the at least two positive SRs as the target SR; or
   in a case where at least two positive SRs are to be transmitted, selecting a positive SR with a highest priority as the target SR according to physical layer priorities of the at least two SRs, or
   in a case where the physical layer priorities of the SRs are not provided, selecting a positive SR from the at least two positive SRs as the target SR.

5. The method of claim 3, wherein the determining a first target transmission sequence using a first sequence index initial value corresponding to the target SR comprises:
   determining the first target transmission sequence based on a sum of the first sequence index initial value and an index offset, wherein the index offset is determined based on a number of bits of the HARQ-ACK information and values of the bits of the HARQ-ACK information.

6. The method of claim 5, wherein
   in a case where the HARQ-ACK information is one bit, the HARQ-ACK information being a non-acknowledgment (NACK) corresponds to an index offset of 3, and the HARQ-ACK information being an ACK corresponds to an index offset of 9; and in a case where the HARQ-ACK information is two bits, the HARQ-ACK information with two bits being in order NACK and NACK corresponds to an index offset of 1, the HARQ-ACK information with two bits being in order NACK and ACK corresponds to an index offset of 4, the HARQ-ACK information with two bits being in order ACK and ACK corresponds to an index offset of 7, and the HARQ-ACK information with two bits being in order ACK and NACK corresponds to an index offset of 10; or,
   in a case where the HARQ-ACK information is one bit, the HARQ-ACK information being a NACK corresponds to an index offset of 0, and the HARQ-ACK information being an ACK corresponds to an index offset of 6; and in a case where the HARQ-ACK information is two bits, the HARQ-ACK information with two bits being in order NACK and NACK corresponds to an index offset of 0, the HARQ-ACK information with two bits being in order NACK and ACK corresponds to an index offset of 3, the HARQ-ACK information with two bits being in order ACK and ACK corresponds to an index offset of 6, and the HARQ-ACK information with two bits being in order ACK and NACK corresponds to an index offset of 9.

7. The method of claim 2, wherein the determining a transmission mechanism for the target SR and the HARQ-ACK information comprises:
   in a case where a PUCCH format 0 of the target SR and a PUCCH format 1 of the HARQ-ACK information overlap in a time domain, determining a second transmission mechanism according to a priority corresponding to the target SR and a priority corresponding to the HARQ-ACK information.

8. The method of claim 7, wherein the second transmission mechanism comprises:
   in a case where the target SR corresponds to a high priority and the HARQ-ACK information corresponds to a low priority, transmitting only the target SR using a PUCCH format 0 method in a PUCCH resource corresponding to the target SR, or determining a first target transmission sequence using a first sequence index initial value corresponding to the target SR, and transmitting the first target transmission sequence using a PUCCH format 0 method in a PUCCH resource corresponding to the target SR;
   in a case where the target SR corresponds to a high priority and the HARQ-ACK information corresponds to a high priority, transmitting only the HARQ-ACK information using a PUCCH format 1 method in a PUCCH resource corresponding to the HARQ-ACK information, or determining a first target transmission sequence using a first sequence index initial value corresponding to the target SR, and transmitting the first target transmission sequence using a PUCCH format 0 method in a PUCCH resource corresponding to the target SR;

in a case where the target SR corresponds to a low priority and the HARQ-ACK information corresponds to a low priority, transmitting only the HARQ-ACK information using the PUCCH format 1 method in the PUCCH resource corresponding to the HARQ-ACK information; and in a case where the target SR corresponds to a low priority and the HARQ-ACK information corresponds to a high priority, transmitting only the HARQ-ACK information using the PUCCH format 1 method in the PUCCH resource corresponding to the HARQ-ACK information.

9. The method of claim 8, wherein the determining a first target transmission sequence using a first sequence index initial value corresponding to the target SR comprises:

determining the first target transmission sequence based on a sum of the first sequence index initial value and an index offset, wherein the index offset is determined based on a number of bits of the HARQ-ACK information and values of the bits of the HARQ-ACK information.

10. The method of claim 2, wherein the determining a transmission mechanism for the target SR and the HARQ-ACK information comprises:

in a case where a PUCCH format 0 of the target SR and a PUCCH format 1 of the HARQ-ACK information overlap in a time domain, determining a third transmission mechanism according to a priority corresponding to the HARQ-ACK information.

11. The method of claim 10, wherein the third transmission mechanism comprises:

in a case where the HARQ-ACK information corresponds to a low priority, determining a first target transmission sequence using a first sequence index initial value corresponding to the target SR, and transmitting the first target transmission sequence using a PUCCH format 0 method in a PUCCH resource corresponding to the target SR; and in a case where the HARQ-ACK information corresponds to a high priority, transmitting only the HARQ-ACK information using a PUCCH format 1 method in a PUCCH resource corresponding to the HARQ-ACK information, or in a case where the HARQ-ACK information corresponds to a high priority, determining a second target transmission sequence using a second sequence index initial value corresponding to the HARQ-ACK information, and transmitting the second target transmission sequence using the PUCCH format 1 method in the PUCCH resource corresponding to the HARQ-ACK information.

12. The method of claim 11, wherein the determining a second target transmission sequence using a second sequence index initial value corresponding to the HARQ-ACK information comprises:

determining the second target transmission sequence based on a sum of the second sequence index initial value and an index offset, wherein the index offset is determined based on a number of bits of the HARQ-ACK information and values of the bits of the HARQ-ACK information.

13. The method of claim 2, wherein the determining a transmission mechanism for the target SR and the HARQ-ACK information comprises:

in a case where a PUCCH of the target SR and a PUCCH format 0 of the HARQ-ACK information overlap in a time domain, determining a fourth transmission mechanism according to a third sequence index initial value corresponding to the HARQ-ACK information;

wherein the fourth transmission mechanism comprises:

determining a third target transmission sequence using the third sequence index initial value corresponding to the HARQ-ACK information, and transmitting the third target transmission sequence using a PUCCH format 0 method in a PUCCH resource corresponding to the HARQ-ACK information.

14. The method of claim 13, wherein the target SR is an SR with a highest priority of at least one positive SR.

15. The method of claim 13, wherein the determining a third target transmission sequence using a third sequence index initial value corresponding to the HARQ-ACK information comprises:

determining the third target transmission sequence based on a sum of the third sequence index initial value and an index offset, wherein the index offset is determined based on a number of bits of the HARQ-ACK information and values of the bits of the HARQ-ACK information.

16. A communication node, comprising:

at least one processor; and a storage apparatus which is configured to store at least one program, wherein, the at least one program, when being executed by the at least one processor, causes the at least one processor to implement:

in response to a physical uplink control channel (PUCCH) of first uplink control information (UCI) with a high-priority and a PUCCH of second UCI with a low-priority overlap in a time domain, performing a transmission using one designated PUCCH, wherein the first UCI and the second UCI are multiplexed into the one designated PUCCH, and the transmission of the one designated PUCCH is transmitted by using a power based on a power control parameter associated with the first UCI with the high-priority, wherein the second UCI with the low-priority, when being multiplexed, is transmitted by using the power control parameter associated with the first UCI with the high-priority; and wherein each of the first UCI and the second UCI comprises at least one of hybrid automatic repeat request acknowledgement (HARQ-ACK) information or a scheduling request (SR);

a priority of the SR is indicated by indication information in configuration information of radio resource control (RRC) of the SR; and a priority corresponding to the HARQ-ACK information is determined according to a priority of an HARQ-ACK codebook indicated by an information domain in a physical downlink control channel (PDCCH).

17. A non-transitory computer-readable storage medium storing a computer program, wherein the computer program, when being executed by a processor, implements the transmission method of claim 1.

18. A reception method, comprising:

in response to a physical uplink control channel (PUCCH) of first uplink control information (UCI) with a high-priority and a PUCCH of second UCI with a low-priority overlap in a time domain, performing a reception by one designated PUCCH, wherein the first UCI and the second UCI are multiplexed into the one designated PUCCH, and a transmission of the one designated PUCCH is transmitted by using a power based on a power control parameter associated with the first UCI with the high-priority, wherein the second UCI with the low-priority, when being multiplexed, is transmitted by using the power control parameter associated with the first UCI with the high-priority, and wherein each of the first UCI and the second UCI comprises at least one of hybrid automatic repeat request acknowledgement (HARQ-ACK) information or a scheduling request (SR);

a priority of the SR is indicated by indication information in configuration information of radio resource control (RRC) of the SR; and a priority corresponding to the HARQ-ACK information is determined according to a priority of an HARQ-ACK codebook indicated by an information domain in a physical downlink control channel (PDCCH).

* * * * *